United States Patent

Shona

[11] Patent Number: 5,799,085
[45] Date of Patent: Aug. 25, 1998

[54] METHOD OF EFFECTING MUTUAL AUTHENTICATION

[75] Inventor: Yoshihiro Shona, Tokyo, Japan

[73] Assignee: Oki Electric Industry Co., Ltd., Tokyo, Japan

[21] Appl. No.: 688,924

[22] Filed: Jul. 31, 1996

[30] Foreign Application Priority Data

Nov. 2, 1995 [JP] Japan ................. 7-285496

[51] Int. Cl.⁶ ................. H04L 9/00; H04L 9/32
[52] U.S. Cl. ................. 380/23; 380/24; 380/25; 380/46; 380/49; 235/379; 235/380
[58] Field of Search ................. 380/23, 24, 25, 380/9, 46, 49, 50, 59; 340/825.31, 825.34; 235/379, 380

[56] References Cited

U.S. PATENT DOCUMENTS

| | | | |
|---|---|---|---|
| 5,225,664 | 7/1993 | Iijima | 380/23 X |
| 5,434,918 | 7/1995 | Kung et al. | 380/25 |
| 5,544,245 | 8/1996 | Tsubakiyama | 380/23 X |

FOREIGN PATENT DOCUMENTS

| | | |
|---|---|---|
| 0 440 158 | 8/1991 | European Pat. Off. . |
| 0 479 617 | 4/1992 | European Pat. Off. . |
| 43 39 460 | 4/1995 | Germany . |
| 5-75598 | 3/1993 | Japan . |
| 2 144 564 | 3/1985 | United Kingdom . |

*Primary Examiner*—Bernarr E. Gregory
*Attorney, Agent, or Firm*—Wenderoth, Lind & Ponack, L.L.P.

[57] ABSTRACT

A random number generated from a host device upon a first mutual authentication or a random number obtained by processing the generated random number is stored in a random number storage area of an IC apparatus and used for a subsequent mutual authentication.

6 Claims, 3 Drawing Sheets

METHOD OF EFFECTING MUTUAL AUTHENTICATION

BACKGROUND OF THE INVENTION

1. Field of the Invention

This invention relates to an IC card system that requires high security, and particularly to a method of mutually authenticating both an IC card and a host device which is suitable for use in the IC card.

2. Description of the Related Art

This type of mutual authenticating method has conventionally comprised a first certification or authentication for confirming the validity of a host or high level device on the IC card side and a second certification or authentication for confirming the validity of an IC card on the host device side.

The first authentication will first be described.

The IC card generates a random number R1 using a random number generating means incorporated therein and effects an encoding (e.g., enciphering by way of example) process on the generated random number R1 to create data X. Further, the host device receives the random number R1 from the IC card and effects the encoding process on the random number R1 to create data X'. The IC card receives the data X' from the host device and makes a comparison between the data X and X' so as to authenticate the validity of the host device.

The second authentication will, next be described.

The host device generates a random number R2 using a random number generating means provided therein and effects an encoding process on the generated random number R2 to create data Y'. Further, the IC card receives the random number R2 from the host device and effects an encoding process on the random number R2 to create data Y. The host device receives the data Y from the IC card and performs a comparison between the data Y and Y' so as to certify the validity of the IC card.

At this time, the generation of the random number for each mutual authentication and the creation of the different X and Y values for each mutual authentication are intended to prevent a malicious third party, who has monitored the exchange of telegraphic messages used during the previous mutual authentication, from obtaining the mutual authentication through the exchange of the previously-used messages with one another. In an IC card system that needs higher security, a process for creating the X and Y values using different encipherment keys is commonly performed in accordance with the first and second authentications.

SUMMARY OF THE INVENTION

An object of the present invention is to provide a method of effecting mutual authentication, which is suitable for eliminating the need of random number generating means such as a hard random number generator, by implementing a means for generating a random number by software using a microprocessor, or the like, from an IC apparatus.

According to one aspect of the present invention, for achieving the above object, there is provided a method of effecting mutual authentication, comprising the following processes:

a first mutual authentication and a second mutual authentication subsequent to the first mutual authentication each of which comprising a first authenticating process and a second authenticating process, the first authenticating process for allowing an IC apparatus to compare data obtained by encoding a random number stored in a random number storage area of the IC apparatus with the IC apparatus and data obtained by encoding the random number stored in the random number storage area with a host device, the second authenticating process for allowing the host device to compare data obtained by encoding a random number generated from the host device with the IC apparatus and data obtained by encoding the random number generated from the host device with the host device, the second authenticating process of the first mutual authentication for storing the random number generated from the host device in the random number storage area, the first authenticating process of the second mutual authentication for using the random number generated from the host device upon the second authenticating process of the first mutual authentication.

Further, the present application discloses other various inventions made to achieve the above object. These inventions will be understood from the appended claims, the following embodiments and the accompanying drawings.

BRIEF DESCRIPTION OF THE DRAWINGS

THE objects, features and advantages of the present invention will be better understood from the following description taken in connection with the accompanying drawings in which.

DETAILED DESCRIPTION OF THE PREFERRED EMBODIMENTS

Figure 1:
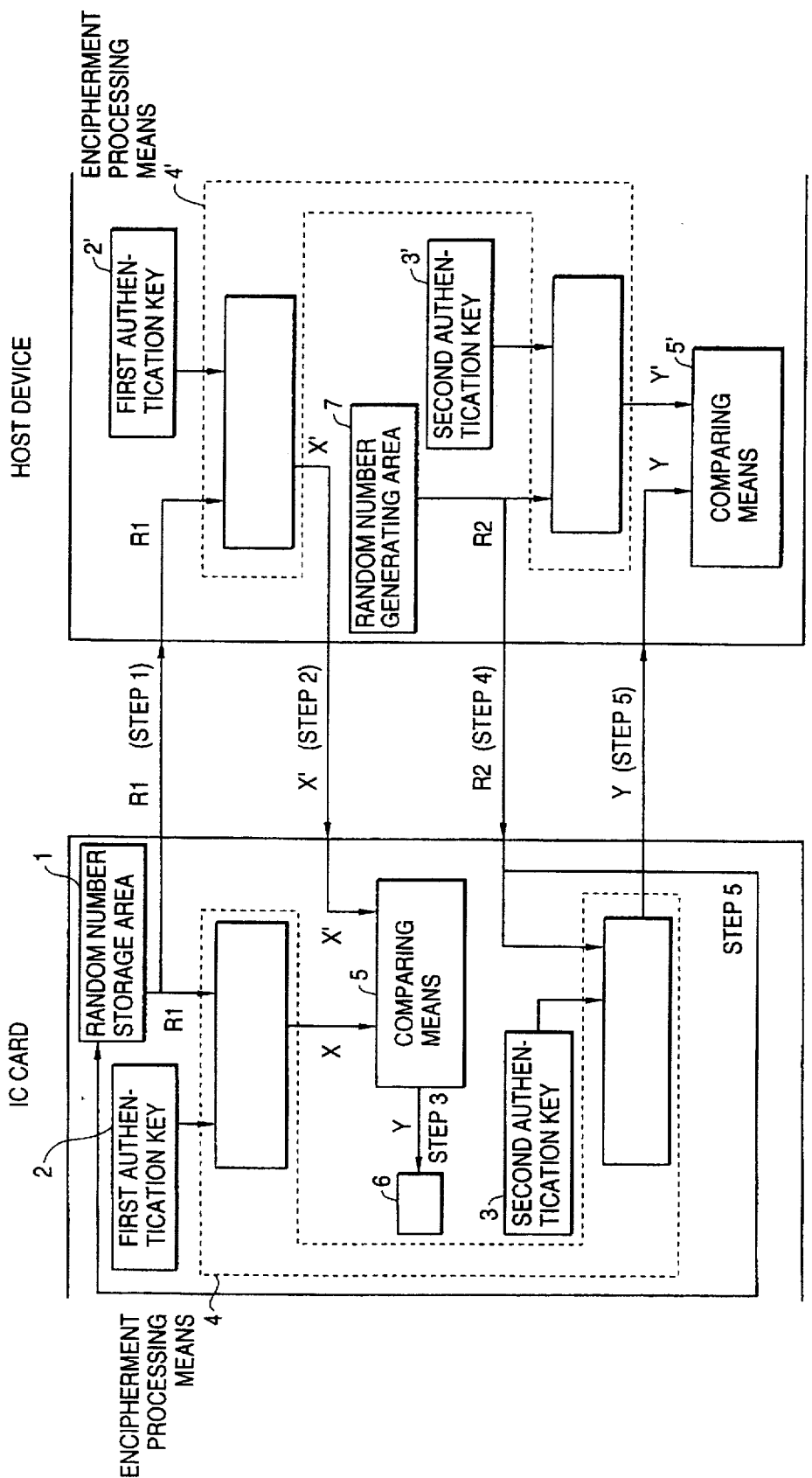
FIG. 1 is a view showing a mutual authentication processing procedure of a first embodiment of the present invention.

FIG. 1 shows a mutual authentication processing procedure of a first embodiment of the present invention. The first embodiment will be described with reference to FIG. 1.

An IC card(corresponding to an IC apparatus)comprises at least a random number storage area 1 composed of an electrically rewritable storing means such as an Electrically Erasable Programmable Read Only memory(hereinafter called an EEPROM) or the like, first and second authentication keys 2 and 3, an encipherment processing means 4 for performing an enciphering process, a comparing means 5 for making a comparison between data, and a first flag 6 for judging whether the validity of a host or high level device has been normally authenticated.

On the other hand, the host device includes a first authentication key 2' identical to the first authentication key 2, a second authentication key 3' identical to the second authentication key 3, an encipherment processing means 4', a comparing means 5' and a random number generating means 7.

The operation of the first embodiment will now be described.

Firstly, the host device requires the IC card to output the data stored in the random number storage area 1. In doing so, the IC card outputs a random number R1 corresponding to the data stored in the random number storage area 1 to the host device (Step 1).

Using the encipherment processing means 4', the host device enciphers the random number R1 with the first authentication key 2' to create enciphered data X' and outputs the created enciphered data X' to the IC card (Step 2).

Using the encipherment processing means 4, the IC card enciphers the random number R1 with the first authentication key 2 to create enciphered data X. Next, the IC card compares the enciphered data X and the enciphered data X' out putted from the host device through the use of the comparing means 5. If they match with each other, then the IC card sets "1" to the first flag 6 (Step 3).

Next, the host device generates a random number R2 using the random number generating means 7 and outputs it to the IC card (Step 4).

Using the encipherment processing means 4, the IC card enciphers the random number R2 with the second authentication key 3 to create enciphered data Y and outputs the created enciphered data Y to the host device. Further, the IC card allows the random number storage area 1 to store the random number 2 therein as a substitute for the random number R1 (Step 5).

Using the encipherment processing means 4', the host device enciphers the random number R2 with the second authentication key 3' to create enciphered data Y'. Next, the host device compares the enciphered data Y and the enciphered data Y' using the comparing means 5'. If they coincide with each other, then the host device judges that the mutual authentication has been successfully completed and proceeds to the next process using an IC card for transactions or the like (Step 6).

Incidentally, the first flag 6 is cleared to "0" upon application of power to the IC-card or when it is reset. In the case of a process necessary to make a decision as to the validity of the host device subsequent to Step 6, the IC card judges whether the first flag 6 is "1" and if it is "1" the process should be done.

According to the first embodiment as described above, since the IC card allows the random number storage area to store the random number R2 generated from the host device as the substitute for the random number R1 upon completion of the present mutual authentication, the IC card outputs the random number R2 corresponding to the data stored in the random number storage area to the host device upon the next mutual authentication when the host device requires the IC card to output the data stored in the random number storage area. Thus, for the next mutual authentication, the random number R2 is used as a random number for judging the validity of the host device similar to the case of the random number R1 which was used for the present mutual authentication.

Thus, in the first embodiment, the IC card is not required to have the random number generating means therein and hence a chip for the IC card can be simplified in structure. Accordingly, even an IC card with no microprocessor, which is composed of only simple logic capable of providing enciphering/encoding and a comparison decision and an EEPROM, enables the mutual authentication, whereby a cost-reduced and high-security IC card system can be achieved.

Figure 2:
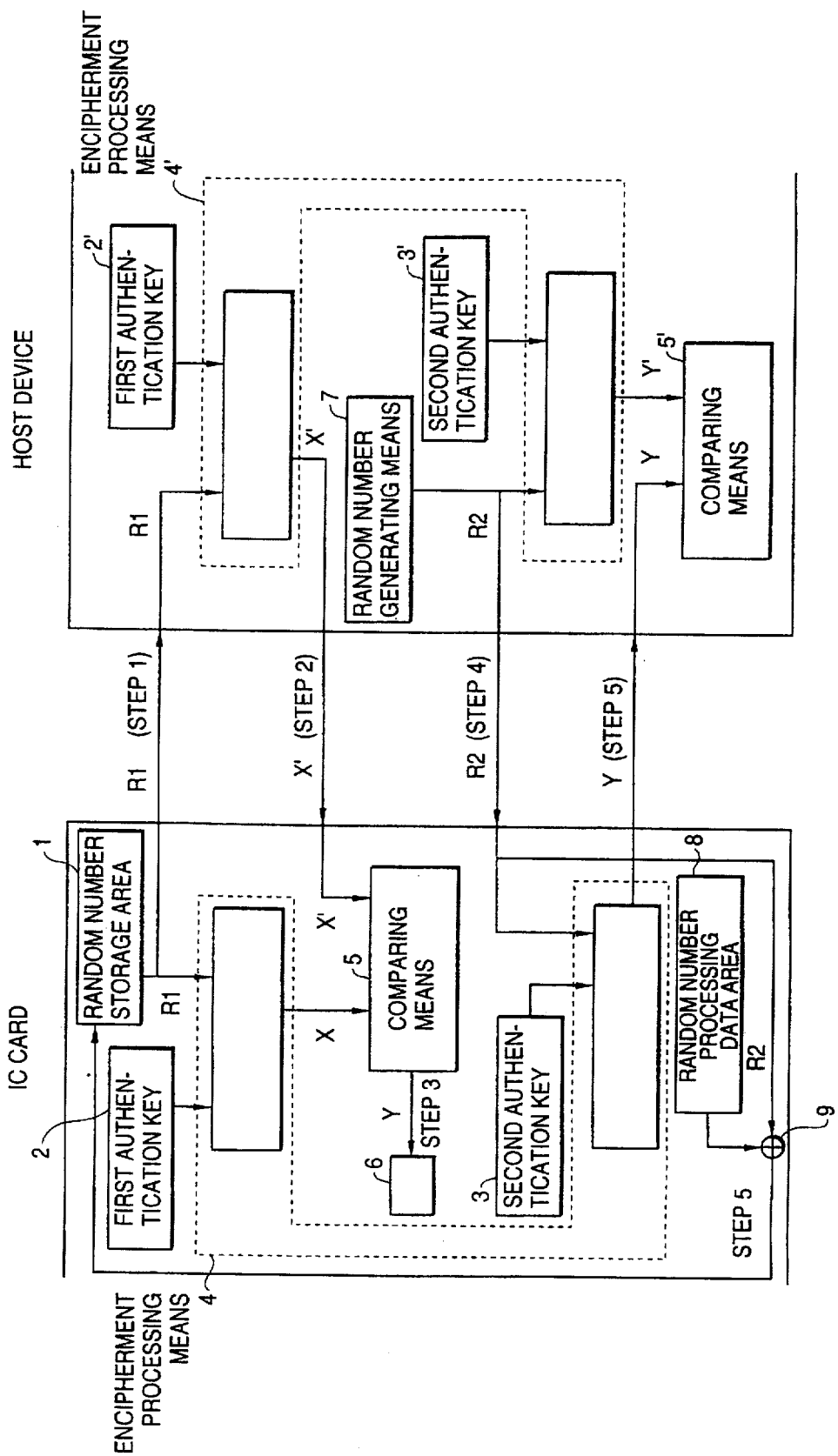
FIG. 2 is a view illustrating a mutual authentication processing procedure of a second embodiment of the present invention.

FIG. 2 shows a mutual authentication processing procedure of a second embodiment of the present invention. The same elements of the structure shown in FIG. 1 are identified by the same reference numerals and their description is therefore omitted.

In the second embodiment, a random number processing data area 8 and an XOR circuit 9 are further added to the IC card shown in FIG. 1.

The second embodiment is identical in operation to the first embodiment at Steps 1 through 4 but is different in operation from the first embodiment at Step 5.

In the first embodiment, at Step 5, the random number R2, inputted from the host device, is stored in the random number storage area as it is. In the second embodiment, on the other hand, the random number processing data area 8 and the XOR circuit 9 are provided. The XOR circuit 9 executes an exclusive-OR function to the random number R2 input from the host device and the data stored in the random number-processing data area 8. The resultant random number is stored in a random number storage area 1 as a substitute for a random number R1.

Thus, when the host device requires the IC card to output the data stored in the random number storage area upon the next mutual authentication, the IC card outputs a random number (corresponding to the random number obtained by executing the exclusive-OR function to the random number R2 and the data stored in the random number processing data area 8) to the host device. Thus, for the next mutual authentication, the random number obtained by executing the exclusive-OR function referred to above is used as the random number utilized for judging the validity of the host device similar to the case of the random number R1 which was used for the present mutual authentication.

According to the second embodiment as described above, since it is difficult to realize externally that the random number R2 for the present mutual authentication is being used to make a decision as to the validity of the host device at the time of the next mutual authentication, a level of security which is higher than that of the first embodiment can be achieved.

In the second embodiment, even if the first and second authentication keys are integrated together, enciphered data inputted from the IC card to a comparing means of the host device upon a certain mutual authentication is different in value from enciphered data input from the host device to a comparing means of the IC card for the next mutual authentication. Thus, in the second embodiment, the IC card can be simplified in structure without decreasing the level of security even against those respectively provided with the first and second authentication keys even if the authentication keys are integrated together.

In the second embodiment, the XOR circuit 9 is provided but an AND circuit, an OR circuit or a bit inverter or the like may be provided in place of the XOR circuit 9. Further, the data stored in the random number processing data area 8 may be stored in a mask ROM or the like. Alternatively, the data may be provided within an EEPROM so as to allow changing of the data at regular intervals. Furthermore, the balance data or the like stored in the EEPROM may be utilized as it is without specially providing the random number processing data area 8. Since the balance data is changed in this case each time the IC card is used, an improvement in security will be achieved without the need for changing the data at regular intervals. Further, even if the random number R2 is stored in the random number storage area 1 as it is and the random number R2 and the data stored in the random number processing data area 8 are executed in an exclusive-OR function at the time of the next mutual authentication and the resultant random number is output to the host device at Step 1, the same effect as described above can be obtained.

Figure 3:
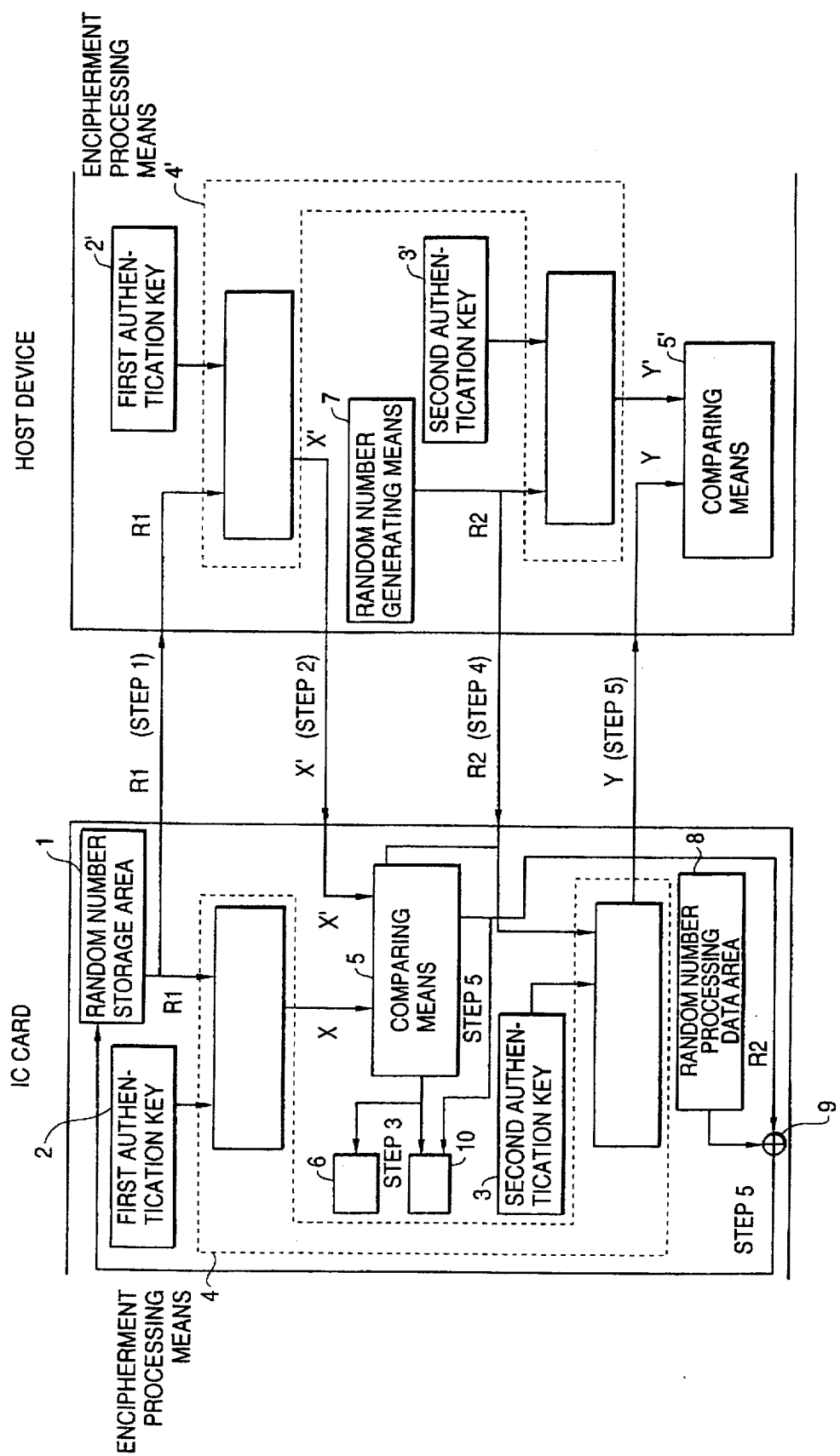
FIG. 3 is a view depicting a mutual authentication processing procedure of a third embodiment of the present invention.

FIG. 3 shows a mutual authentication processing procedure of a third embodiment. The third embodiment will be described below with reference to FIG. 3.

An IC card comprises at least a random number storage area 1 composed of an electrically rewritable storing means such as an EEPROM or the like, first and second authentication keys 2 and 3, an encipherment processing means 4 for performing an enciphering process, a comparing means 5 for performing a comparison between data, first and second flags 6 and 10, a random number processing data area 8 and an XOR circuit 9.

On the other hand, a host device comprises a first authentication key 2' identical to the first authentication key 2, a second authentication key 3' identical to the second authentication key 3, an encipherment processing means 4', a comparing means 5' and a random number generating means 7.

The operation of the third embodiment will now be described.

First, the host device requires the IC card to output the data stored in the random number storage area 1. In doing so, the IC card outputs a random number R1 corresponding to the data stored in the random number storage area 1 to the host device (Step 1).

Using the encipherment processing means 4', the host device enciphers the random number R1 with the first authentication key 2' to create enciphered data X' and outputs the created enciphered data X' to the IC card (Step 2).

Using the encipherment processing means 4, the IC card enciphers the random number R1 with the first authentication key 2 to create enciphered data X. Next, the IC card compares the enciphered data X and the enciphered data X' outputted from the host device through the use of the comparing means 5. If they match with each other, then the IC card sets "1" to the first flag 6 and the second flag 10 (Step 3).

Next, the host device generates a random number R2 using the random number generating means 7 and outputs it to the IC card (Step 4).

Using the encipherment processing means 4, the IC card generates enciphered data Y obtained by enciphering the random number R2 with the second authentication key 3 and outputs the created enciphered data Y to the host device. Further, the IC card checks the second flag 10. If the second flag 10 is found to have been set to "1", then the IC card allows the random number storage area 1 to store therein data obtained by exclusive-ORing the data stored in the random number processing data area 8 and the random number 2 as a substitute for the random number R1, and clears the second flag 10 to "0". Further, if the second flag 10 is found to have been set to "0", then the IC card prohibits a new random number from being stored in the random number storage area 1 (Step 5).

Using the encipherment processing mean 4', the host device enciphers the random number R2 with the second authentication key 3' to create enciphered data Y'. Next, the host device compares the enciphered data Y and the enciphered data Y' using the comparing means 5'. If they coincide with each other, then the host device judges that the mutual authentication has been successfully completed and proceeds to the next process for transactions or the like (Step 6).

Incidentally, the first flag 6 and the second flag 10 are respectively cleared to "0" upon application of power to the IC card or when it is reset. In the case of a process needed to perform the mutual authentication subsequent to Step 6, the IC card confirms whether the first flag 6 and the second flag 10 are respectively "1" and "0" and judges whether the next process should be done.

According to the third embodiment as described above, the second flag 10 is provided. When the second flag 10 is "0", no new random number is stored in the random number storage area 1. Thus, even if a malicious third party recognizes a method of generating a random number to be stored in a random number storage area and monitors the previously-executed mutual authentication, the third party is not able to store the random number R1 stored in the random number storage area 1 upon the previous inter authentication in the random number storage area again and execute a first certification or authentication (corresponding to the authentication for judging the validity of the host device) in the same method as described previously.

In the third embodiment, the second flag 10 is further added to the second embodiment. However, the second flag 10 may be provided in the first embodiment. Namely, the IC card compares the enciphered data X and the enciphered data X' outputted from the host device through the used of the comparing means 5 at Step 3 in the first embodiment. If they match with each other, then the IC card sets "1" to the first flag 6 and also sets "1" to the second flag 10. At Step 5, the IC card checks the second flag 10. If the second flag 10 is found to have been set to "1", then the random number R2 is stored in the random number storage area 1 and the second flag 10 is cleared to "0".

Thus, it is apparent to say that the idea of the third embodiment may be applied to the first embodiment in this way.

In the IC card system, the mutual authentication can be effected on a partial process such as for a monetary process or the like according to purposes. There may be cases where most of the processes need only be subjected to card authentication (second authentication) by the host device. Since no random number is stored in the random number storage area 1 in this case, the number of times that the EEPROM corresponding to the random number storage area is renewed, can be reduced as compared with the first and second embodiments, whereby the effect of increasing the life of the IC card can be achieved.

In the first through third embodiments, the enciphering process is performed using the authentication keys. However, an encoding process for executing a given specific process may be performed as an alternative to the enciphering process. If the random number storage area 1 is of an electrically rewritable nonvolatile storing means, then any one may be used. Further, the comparing means 5 and 5' may be hard means such as a comparator or the like or may be a soft process executed by a microprocessor. However, the use of the comparator as the comparing means 5 on the IC card side makes it possible to simplify the IC card in structure. Incidentally, the polarities of the first flag 6 and the second flag 10 are not necessarily limited to the polarity shown in the embodiment.

In the third embodiment, whether or not the second flag 10 is "1" is judged by the comparing means 5 but may also be determined by a simple gate means.

In the embodiments according to the present invention, the encoding has been described by using the term encipherment by way of example. It is noted, however that the encipherment processing means may perform the encoding process in ways other than the enciphering process.

Incidentally, the present invention is applicable to a system using all sorts of portable data carriers and are not necessarily limited to card forms.

While the present invention has been described with reference to the illustrative embodiments, this description is not intended to be limiting. Various modifications of the illustrative embodiments, as well as other embodiments of the invention, will be apparent to those skilled in the art by reference to this description. Such modifications are not to be regarded as a departure from the spirit and scope of the present invention and all such modifications are intended to be included within the scope of the invention. following claims.

What is claimed is:

1. A method of effecting mutual authentication between an apparatus, which comprises an integrated circuit, and a host device, said method comprising:

performing a first authenticating process comprising:
encoding a first random number, which is stored in a storage area of the apparatus, in the apparatus to thereby obtain first data;
encoding the first random number in the host device to thereby obtain second data; and
comparing the first data and the second data in the apparatus;

performing a second authenticating process comprising:
generating a second random number in the host device;
encoding the second random number in the host device to thereby obtain third data;
encoding the second random number in the apparatus to thereby obtain fourth data; and
comparing the third data and the fourth data in the host device;

wherein the mutual authentication is determined based upon the comparisons performed in said first and second authenticating processes, and wherein the second random number, generated by the host device in said second authenticating process, is stored as the first random number in the storage area of the apparatus for use in a subsequent mutual authentication.

2. A method of effecting mutual authentication between an apparatus, which comprises an integrated circuit, and a host device, said method comprising:

performing a first authenticating process comprising:
encoding a first random number, which is stored in a storage area of the apparatus, in the apparatus to thereby obtain first data;
encoding the first random number in the host device to thereby obtain second data; and
comparing the first data and the second data in the apparatus;

performing a second authenticating process comprising:
generating a second random number in the host device;
encoding the second random number in the host device to thereby obtain third data;
encoding the second random number in the apparatus to thereby obtain fourth data; and
comparing the third data and the fourth data in the host device;

wherein the mutual authentication is determined based upon the comparisons performed in said first and second authenticating processes, and wherein the second random number, generated by the host device in said second authenticating process, is subjected to processing to obtain a third random number and the third random number is stored as the first random number in the storage area of the apparatus for use in a subsequent mutual authentication.

3. A method of effecting mutual authentication between an apparatus, which comprises an integrated circuit, and a host device, said method comprising:

performing a first authenticating process comprising:
processing a first random number which is stored in a storage area of the apparatus to obtain a processed random number;
encoding the processed random number in the apparatus to thereby obtain first data;
encoding the processed random number in the host device to thereby obtain second data; and
comparing the first data and the second data in the apparatus;

performing a second authenticating process comprising:
generating a second random number in the host device;
encoding the second random number in the host device to thereby obtain third data;
encoding the second random number in the apparatus to thereby obtain fourth data; and
comparing the third data and the fourth data in the host device;

wherein the mutual authentication is determined based upon the comparisons performed in said first and second authenticating processes, and wherein the second random number, generated by the host device in said second authenticating process, is stored as the first random number in the storage area of the apparatus for use in a subsequent mutual authentication.

4. A method of effecting mutual authentication between an apparatus, which comprises an integrated circuit, and a host device, said method comprising:

performing a first authenticating process comprising:
encoding a first random number, which is stored in a storage area of the apparatus, in the apparatus to thereby obtain first data;
encoding the first random number in the host device to thereby obtain second data; and
comparing the first data and the second data in the apparatus;

performing a second authenticating process comprising:
generating a second random number in the host device;
encoding the second random number in the host device to thereby obtain third data;
encoding the second random number in the apparatus to thereby obtain fourth data; and
comparing the third data and the fourth data in the host device;

wherein the mutual authentication is determined based upon the comparisons performed in said first and second authenticating processes, and wherein the second random number, generated by the host device in said second authenticating process, is stored as the first random number in the storage area of the apparatus, for use in a subsequent mutual authentication, in response to a result of the comparison performed in said first authenticating process.

5. A method of effecting mutual authentication between an apparatus, which comprises an integrated circuit, and a host device, said method comprising:

performing a first authenticating process comprising:
encoding a first random number, which is stored in a storage area of the apparatus, in the apparatus to thereby obtain first data;
encoding the first random number in the host device to thereby obtain second data; and
comparing the first data and the second data in the apparatus;

performing a second authenticating process comprising:
generating a second random number in the host device;

encoding the second random number in the host device to thereby obtain third data;

encoding the second random number in the apparatus to thereby obtain fourth data; and comparing the third data and the fourth data in the host device;

wherein the mutual authentication is determined based upon the comparisons performed in said first and second authenticating processes, and wherein the second random number, generated by the host device in said second authenticating process, is subjected to processing to obtain a third random number and the third random number is stored as the first random number in the storage area of the apparatus, for use in a subsequent mutual authentication, in response to a result of the comparison performed in said first authenticating process.

6. A method of effecting mutual authentication between an apparatus, which comprises an integrated circuit, and a host device, said method comprising:

performing a first authenticating process comprising:
processing a first random number which is stored in a storage area of the apparatus to obtain a processed random number;

encoding the processed random number in the apparatus to thereby obtain first data;

encoding the processed random number in the host device to thereby obtain second data; and comparing the first data and the second data in the apparatus;

performing a second authenticating process comprising:
generating a second random number in the host device;

encoding the second random number in the host device to thereby obtain third data;

encoding the second random number in the apparatus to thereby obtain fourth data; and comparing the third data and the fourth data in the host device;

wherein the mutual authentication is determined based upon the comparisons performed in said first and second authenticating processes, and wherein the second random number, generated by the host device in said second authenticating process, is stored as the first random number in the storage area of the apparatus, for use in a subsequent mutual authentication, in response to a result of the comparison performed in said first authenticating process.

* * * * *